United States Patent [19]

Greenawalt

[11] Patent Number: 4,512,138
[45] Date of Patent: Apr. 23, 1985

[54] FORM, FILL AND SEAL MACHINE WITH HOT GAS AND THERMAL IMPULSE SEALING

[75] Inventor: Eddie L. Greenawalt, Lake Jackson, Tex.

[73] Assignee: The Dow Chemical Company, Midland, Mich.

[21] Appl. No.: 354,589

[22] Filed: Mar. 4, 1982

[51] Int. Cl.³ .............................................. B65B 9/00
[52] U.S. Cl. ........................................ 53/451; 53/479; 53/552; 53/373; 219/243
[58] Field of Search ................. 53/373, 451, 479, 552, 53/463; 156/497, 499; 219/243

[56] References Cited

U.S. PATENT DOCUMENTS

| | | | |
|---|---|---|---|
| 2,837,883 | 6/1958 | Bracey | 53/552 |
| 2,928,220 | 3/1960 | Kannengiesser et al. | 53/373 X |
| 3,234,072 | 2/1966 | Dreeben | 53/552 X |
| 3,340,129 | 9/1967 | Grevich | 53/552 X |
| 3,538,676 | 11/1970 | Runo et al. | 53/373 X |
| 3,965,653 | 6/1976 | Lerner | 53/373 X |
| 4,109,792 | 8/1978 | Greenawalt et al. | 53/450 X |
| 4,115,182 | 9/1978 | Wildmoser | 53/228 X |
| 4,235,064 | 11/1980 | Wenger | 53/552 X |
| 4,350,003 | 9/1982 | Greenawalt et al. | 53/373 X |

Primary Examiner—John Sipos
Assistant Examiner—Steven P. Weihrouch
Attorney, Agent, or Firm—McCormick, Paulding & Huber

[57] ABSTRACT

A form, fill and seal machine packages products in a thermoplastic material which is formed into a tube and sealed with a measured amount of the product within. The transverse seals in the tube are formed in a cyclic operation by a pair of cooperating sealing heads. The heads clamp the tube walls together above and below a line of severance between two sequentially formed packages and weld the tube walls together along transverse sealing areas at each side of the line of severance. To heat the material to a fusing temperature, the one sealing head has a chamber from which hot gas is directed onto one side of a sealing area, and the other sealing head has an electrical heater for applying a thermal impulse of heat to the other side of the sealing area. The hot gas presses the thermoplastic material against the electrical heater and provides a "free form" clamp for uniform sealing pressure. The two sources of heat at opposite sides of the sealing areas permit an increased rate of sealing and an increased cyclic rate of the machine.

16 Claims, 7 Drawing Figures

FORM, FILL AND SEAL MACHINE WITH HOT GAS AND THERMAL IMPULSE SEALING

BACKGROUND OF THE INVENTION

The present invention relates to form, fill and seal machines and is concerned in particular with the method and apparatus for sealing thermoplastic or other heat sealable materials which are formed into packages in the machine.

The process of forming heavy duty or industrial size bags in form, fill and seal machines is disclosed in U.S. Pat. Nos. 3,925,963 and 4,109,792. The bags are generally made for twenty-five pounds (11.35 kgs) or more of a product which may be a loose, powdered or granular material such as fertilizer, grain, coal or other bulk materials. The packaging material is supplied to the machine as a web and is formed into a tube which is closed at one end and into which the product is deposited in measured amounts. One bag is formed and filled while the previously formed bag is closed, sealed and severed from the tube by transverse sealing heads.

Because of the size and weight of the bags and also the types of material contained in the bags, the thermoplastic material used is generally a heavy gauge material having, for example, up to a 0.010 inch single or double ply thickness. In the course of a bag-forming operation in the machine, several plies of the material are placed in overlapping relationship to form the long or longitudinal seal and the transverse seals at top and bottom ends of a bag. Thus, the seals must be formed through multiple plies of the bag material. Bags with gussets for stable stacking may require that welds in the sealing areas penetrate through 0.020 inch of the material in some locations and twice that thickness in other areas. For this reason, the machines disclosed in the referenced patents utilize hot gas sealing heads which apply both heat and uniform pressure to one side of the multiply sealing areas. The resulting welds are without undesirable thinning due to the uniform pressure and unrestrained shrinkage. However, the application of heat to just one side of the sealing area limits the rate of heating to the fusing temperature, and correspondingly, the cyclic rate of the machine.

It is, accordingly, a general object of the present invention to provide a sealing mechanism that accommodates a wide range of material thicknesses at high packaging rates without decreasing seal integrity.

SUMMARY OF THE INVENTION

The present invention resides in a method and apparatus for forming bags or packages of a product in a form, fill and seal machine.

In the machine, a web of thermally sealable material is drawn over a tube former to bring opposite longitudinal edges of the web together in overlying relationship. For example, the edges may be placed one on top of the other to form a flat overlap seal or the edges may be placed in side-by-side relationship to form a fin seal. A longitudinal sealing mechanism welds the edges together to form a tube, and a weighing and loading mechanism deposits a measured quantity of the product into the tube which was previously clamped shut and sealed transversely at its lower end by cooperating pair of sealing heads.

The sealing heads are disposed on opposite sides of the formed tube and are mounted for relative movement toward and away from each other to periodically clamp the tube and form the top seal of a previously filled package and the bottom seal of the subsequently filled package. The sealing heads may be reciprocated toward and away from each other while the tube is intermittently advanced between the heads, or the heads may close and travel a short distance with a continuously moving tube.

In accordance with the present invention, one of the sealing heads has means for discharging a hot gas onto one side of a transverse sealing area, and the other of the sealing heads has an electrical heating means disposed on the opposite side of the sealing area for rapidly heating the sealing area to the fusing temperature in cooperation with the hot gas discharging means. In the preferred embodiment of the invention, the sealing heads simultaneously form two parallel seals and also include severing means which part the tube along a line of severance parallel to and between the sealing areas before welding. In the welding operation, the tabs at each side of the line of severance are pressed against the electrical heating means by the hot gas to apply pressure as a "free form" welding clamp.

In operation, the hot gas is applied to the one side of the sealing area while the other side of the area is simultaneously heated to fusing temperature by the electrical heating means. The heating means preferably includes a resistance heater which is energized by means of a current pulse to produce a thermal impulse in the seal area. The application of heat to each side of the weld may be followed by cooling through cold gases and a chilled sealing head to set the weld.

The welds formed by the combined hot gas and thermal impulse process are generally superior in spite of radical and abrupt variations in the thickness of the materials being sealed. Thinning due to displacement of molten plastic by a rigid clamp during welding is avoided, and yet a uniform weld through various layers of material is formed. The dual heat sources improve the rate of sealing and the output rate of the machine.

DESCRIPTION OF THE PREFERRED EMBODIMENTS

Figure 1:
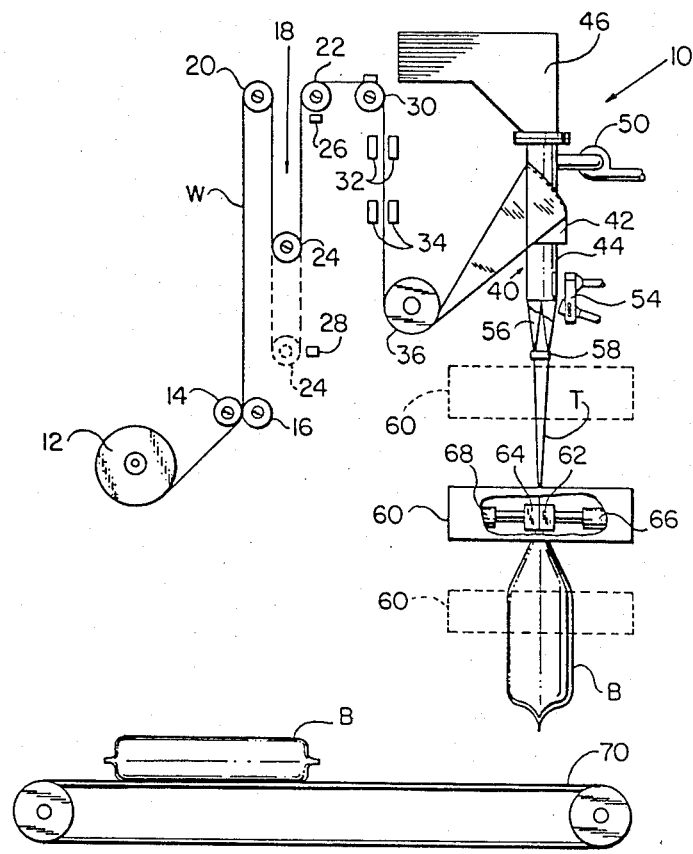
FIG. 1 schematically illustrates a vertical form, fill and seal machine for packaging products in accordance with the present invention.
Figure 2:
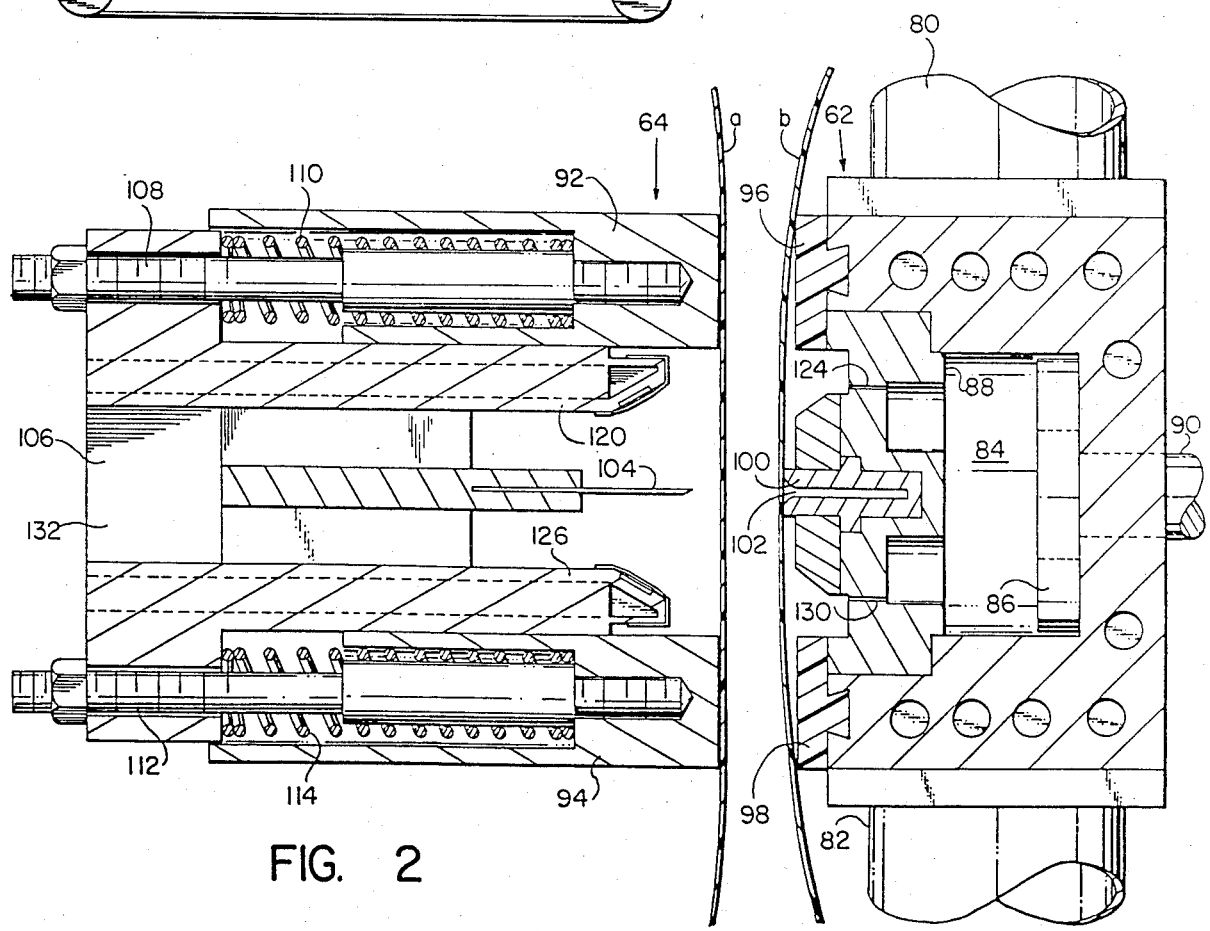
FIG. 2 is a cross sectional view of the sealing heads in the machine of FIG. 1 with the heads in the partially closed position.

FIG. 1 illustrates a vertical form, fill and seal machine which is used to form packages of a product from a web W of thermally sealable material such as polyethylene or other thermoplastic. The machine, generally designated 10, is particularly useful in forming large industrial bags that are filled with fertilizer, limestone and numerous other bulk products.

The web W is drawn from a storage roll 12 through a system of power driven nip rollers 14 and 16 to an accumulator 18. The accumulator includes two idler rollers 20, 22 and a dancer roller 24 which is suspended in a loop of the web W between the rollers 20, 22. A set of optical limit switches 26, 28 are mounted in the machine adjacent the loop and detect when the dancer roller 24 is adjacent the upper and lower limits of the loop defined respectively by the switches. The switches are in turn connected to the power driven nip rollers 14 and 16 and control the speed or operation of the nip rollers so that the dancer roller 24 remains within the limits. The accumulator 18 effectively insures that there is adequate material available to be drawn into the package forming portion of the machine 10 during each stage or cycle of machine operation. The nip rollers 14, 16 may therefore operate independently of the machine cycle.

The web advances from the accumulator 18 over a braking roller 30 which stabilizes the position of the web W as it advances toward the machine. The brake roller 30 also insures that the web remains under a limited degree of tension as the web is pulled forwardly under the approach roller 36 which controls the angle at which the web approaches a tube former 40. Presealers 32 and 34 may be disposed adjacent the web between the rollers 30, 36 to join together multiple plies of web material from different storage rolls. In such case, the resulting bags have a multi-ply or composite structure.

The tube former 40 is conventional and includes a forming collar 42 over which the web is drawn to bring the oppositely disposed longitudinal edges of the web into overlapping relationship and thereby form a packaging tube. The forming collar is mounted coaxially about a cylindrical filling mandrel 44 through which a product passes into the tube from the hopper of a weighing and dumping mechanism 46 at the upper end of the mandrel. An evacuation fan 50 is connected with the interior of the mandrel and establishes a low pressure within to facilitate shaping of the tube with gussettes at lower stations of the machine.

A longitudinal seam sealer 54 on the side of the tube former 40 opposite from the approach roller directs a hot gas against the overlapping edges of the web that, at this point, surrounds the mandrel 44. The hot gas which may be in the range of 600° F. welds or fuses the overlapping edges of the web together as the thermoplastic material is drawn past the sealer. A cold gas is applied to the weld through the sealer 54 immediately after the hot gas to reduce the temperature of the fused material and prevent subsequent distortion or stretching of the longitudinal seal as the tube is drawn downwardly off of the mandrel 44 and loaded with a charge of the product from the dumping mechanism 46. It will be understood that alternatively the longitudinal edges of the web may be placed in side-by-side relationship to form a fin seal extending longitudinally along the tube in place of the overlap seal.

As the formed tube T is drawn downwardly from the long seam sealer 54, it passes over a contoured section 56 of the mandrel and through a gusset forming plate 58 which, with the aid of the evacuation fan 50, establishes gussets in diametrically opposite sides of the tube. The gussets permit a filled bag to assume a more flattened contour suitable for stacking and warehousing.

A sealing carriage 60 reciprocates below the mandrel 44 between upper and lower positions shown in phantom. The sealing carriage serves as a drive mechanism for drawing the web of sheet material over the tube former 40 and the mandrel 44 while the web remains under a limited degree of tension due to the brake roller 30.

Figure 3:
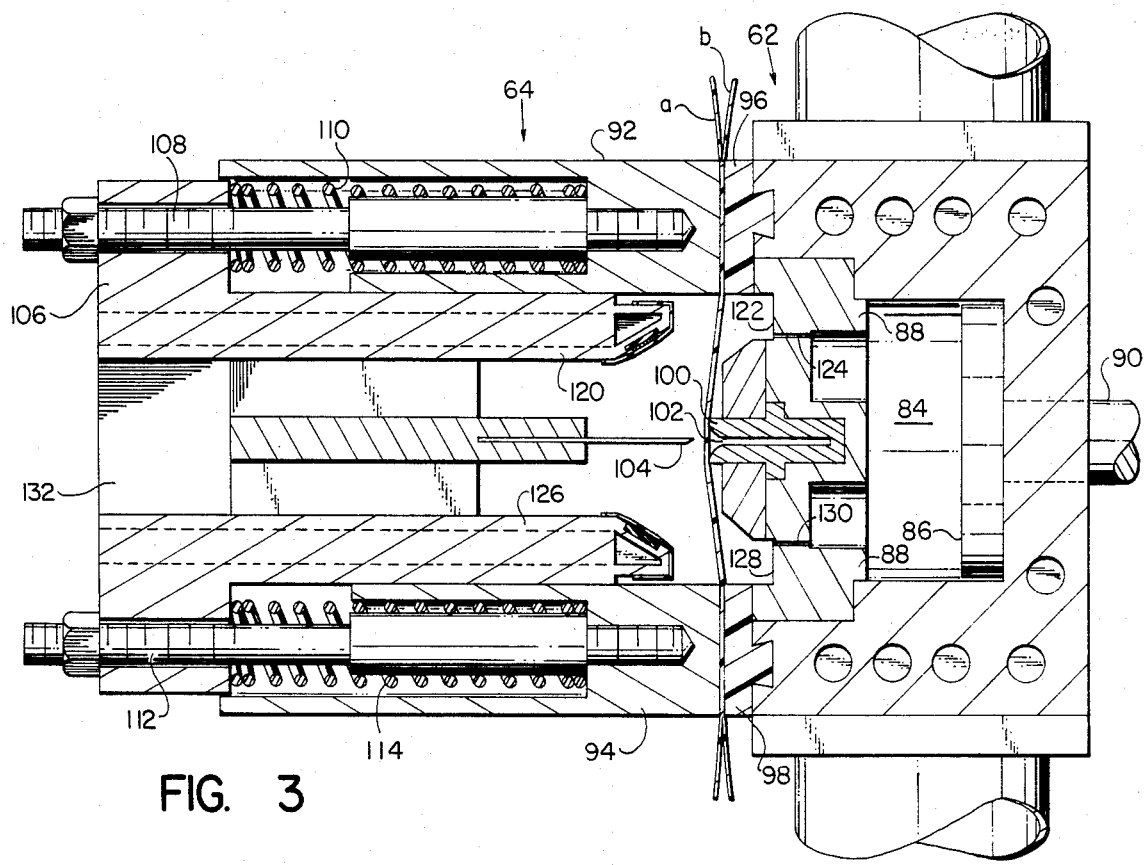
FIG. 3 illustrates the sealing heads in the clamping position prior to severance of the formed tube.

The carriage 60 contains a pair of cooperating water or air cooled sealing heads 62, 64 which open and close on the formed tube to both seal the tube transversally and sever a filled and sealed bag from the upper portions of the tube. The sealing carriage is reciprocated between the upper and lower limits by pneumatic or hydraulic cylinders (not shown) and the sealing heads 62, 64 are reciprocated toward and away from each other by actuating cylinders 66, 68 in phased operation with the carriage reciprocations. When the sealing heads are closed on the formed tube T as shown in FIG. 3, the tube walls are clamped together to close the top of a previously filled bag B suspended below the heads and the bottom of a subsequently filled bag above the heads for sealing. While the carriage 60 is drawing the clamped tube T downwardly over the mandrel 44, a charge of the product is dropped through the mandrel into the clamped end of the tube above the sealing heads.

Figure 4:
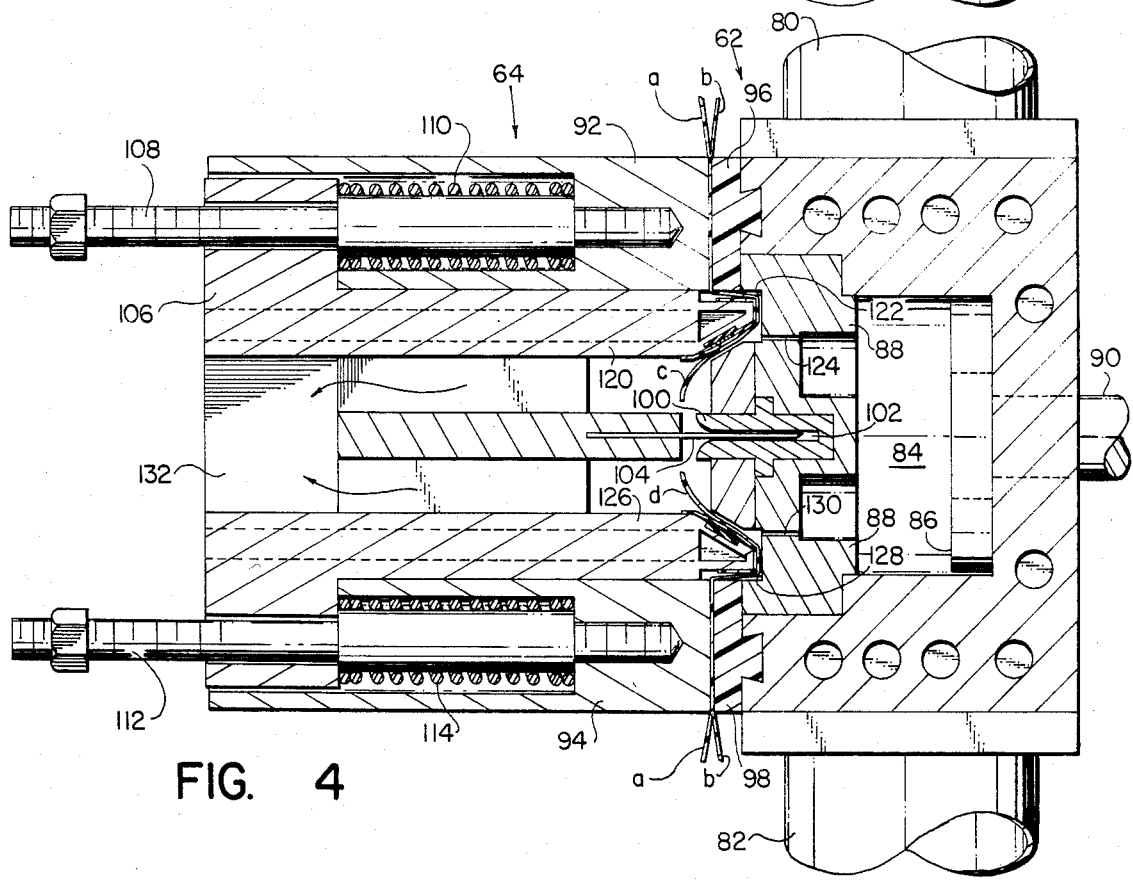
FIG. 4 illustrates the sealing heads after severance of the formed tube and during welding of the packaging material.

As shown in FIG. 4, the sealing heads 62, 64 sever the tube from the filled bag B suspended from the heads. When the bag is lowered into a position above the output conveyor 70 in FIG. 1, the heads are opened and the bag B drops onto the conveyor for transport to a loading or warehouse area.

With the heads open, the sealing carriage 60 translates upwardly to the uppermost position in FIG. 1 and the sealing heads 62, 64 again close and clamp the tube walls together. Between the previous closing of the heads and the return of the heads to the closed position, a charge of the product was dropped through the mandrel 44 into the closed end of the tube T. Thus, each time the heads close, a charge of the product has been deposited in the tube, and the tube is ready to be sealed at the station above the product charge to form another bag.

It will be understood that as an alternative to the reciprocating carriage and sealing heads, the heads may be mounted on conveyor chains in opposed relationship to execute substantially the same opening, closing and reciprocating motions as performed by the carriage 60 and actuating cylinders 66 and 68 in combination.

For a more complete description of the vertical form, fill and seal machine, reference is made to U.S. Pat. Nos. 3,925,963 or 4,109,792 issued to Greenawalt et al.

FIGS. 3 and 4 illustrate the sealing heads 62, 64 in greater detail during a sealing operation. In accordance with the present invention, the sealing head 62 includes means for discharging a hot gas onto one side of a transverse sealing area to weld the clamped tube walls a,b together, and the sealing head 64 has electrical heating means to cooperate with the hot gas means and heat the sealing area from the opposite side. Cooperatively, the hot gas means and the electrical heating means raise the temperature of the thermoplastic packaging material rapidly to the fusing temperature, and weld the tube walls together. Due to the velocity pressure applied by the hot gas, the welds are uniform along the entire length of the sealing area extending transverse to the tube even when the weld must penetrate through various plies of material in the gusset area, the longitudinal or long seam area and other areas in between.

The sealing head 62 is supplied with hot gas for welding the thermoplastic material through conduits 80 and 82 connected with an external source, and the gas is ducted through the head to an internal plenum chamber 84. To control the flow of gas selectively from the chamber to different portions of the seal area, a valve plate 86 is mounted in the chamber and cooperates with a valve seat 88 on the opposite side of the chamber containing lateral slots 124,130 through which the gas is discharged. The plate 86 is operated by means of a piston 90, and by selectively locating and defining the seat 88, various transverse sections of the sealing area on the clamped material may be either supplied or not supplied with hot gas depending upon the positioning of the valve plate 86. For a more complete description of sealing heads having this construction, reference may be made to U.S. Pat. No. 4,350,003 issued Sept. 21, 1982.

The hot gas in the plenum chamber 84 is not discharged until the two heads 62, 64, have closed on the tube and brought the tube walls a,b together in clamping relationship. For this purpose, the head 64 includes an upper clamp block 92 and a lower clamp block 94 and the head 64 includes a clamping pad 96 engagable with the block 92 and a clamping pad 98 engagable with the block 94. The pads are preferably made of a resilient material such a silicone rubber and the clamp blocks are metallic or a hard plastic material.

FIG. 3 illustrates the positioning of the sealing heads 62, 64 just as the clamp blocks 92, 94 and the pads 96, 98 close on the formed tube and move the tube walls into contacting relationship along the portion of the tube captured between the heads. It will be observed that the midportion of the clamped walls is stretched over a replaceable slot piece 100 mounted near the center of the sealing head 62 and extending transversely along the head a distance greater than the transverse length of the tube walls in the clamped condition. The piece 100 has a central slot 102 which receives a knife blade 104 mounted in the sealing head 64 directly opposite the slot. The knife has the same transverse length as the slot 102 so that the clamped tube walls are parted along a line of severence when the knife passes into the slot 102 as shown in FIG. 4.

To allow the knife 104 to penetrate the slot 102 after clamping, the clamp blocks 92, 94 are resiliently mounted on a back plate 106 of the sealing head 64. The clamp block 92 is mounted by means of preloaded guide pins 108 and corresponding compression springs 110 while the block 94 is mounted by means of a set of guide pins 112 and corresponding compression springs 114. After the clamp blocks 92, 94 make contact with the pads 96, 98 as shown in FIG. 3, the back plate 106 of the head 64 and the entire head 62 continue to move toward one another while the springs 110, 114 provide the needed compliance. Continued movement of the back plate causes the knife 104 to contact and sever the clamped tube walls and then pass into the slot 102 within the sealing head 62. It will be observed that the clamping action provided by the blocks and pads holds the tube walls in tension across the slot while the knife severs the tube material.

When the tube is severed as shown in FIG. 4, two sealing tabs c,d are created in the packaging material between the line of severance and the clamping pads 96 and 98, respectively. To properly position the sealing tab c for welding, the backing plate 106 is provided with a projecting, water or air cooled detent 120 and the sealing head 62 is provided with a corresponding recess 122 that receives the detent and locates the tab in a narrow space between the sealing heads and adjacent the slot 124 connecting the space with the plenum chamber 84. Similarly, the backing plate 106 includes another detent 126 which, with the heads closed, projects into a recess 128 and captures the tab d in a narrow space that is connected with the plenum chamber 84 through the slot 130. The narrow spaces defined between the detents and recesses capture the sealing tabs c,d with limited freedom of movement so that hot gas discharged from the head 62 through the slots 124, 130 is directed over the tabs to heat the material to fusing temperature and weld the tube walls a,b together. From the narrow spaces the hot gas flows through the sealing head 64 as indicated by the arrows and is discharged by means of vents 132 in the backing plate 106.

Figure 5:
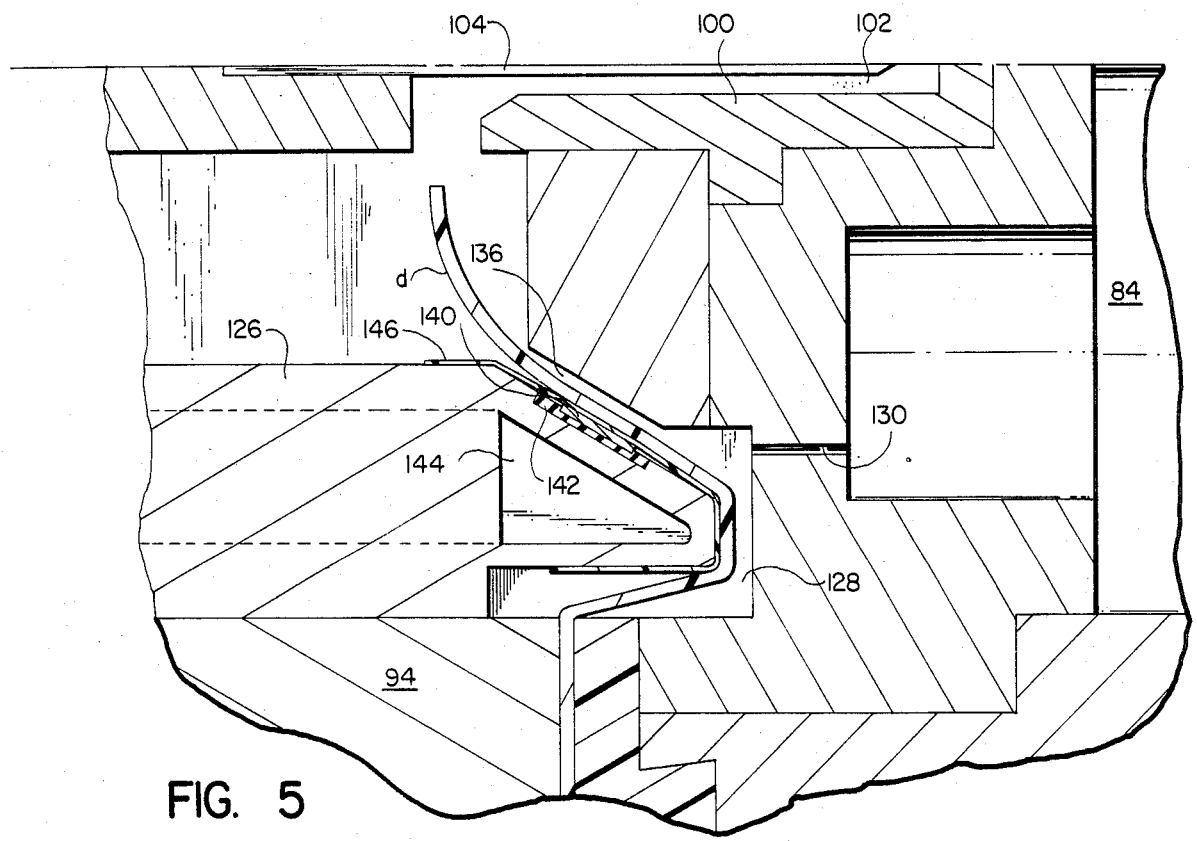
FIG. 5 is an enlarged fragmentary view of the sealing heads in section during welding of the severed tube.

As shown in greater detail in FIG. 5, the narrow space between the detent 126 and recess 128 defines a channel 136 which extends generally at a 30° angle to the slot 130 from the plenum chamber 84. Consequently, as the hot gas is discharged through the slot into the recess, it impinges upon the sealing tab d at an angle and presses the tab against a sloping surface of the detent 126 containing an electrical heating or resistance element 140. The velocity pressure developed by the hot gas on the tab d is relatively uniform along the entire transverse extent of the tab and acts as a "free form" clamp. In other words, the pressure applied by the gas is uniform regardless of the thickness or number of plies of the tube material at different locations along the length of the transverse sealing area adjacent the heater.

Figure 6:
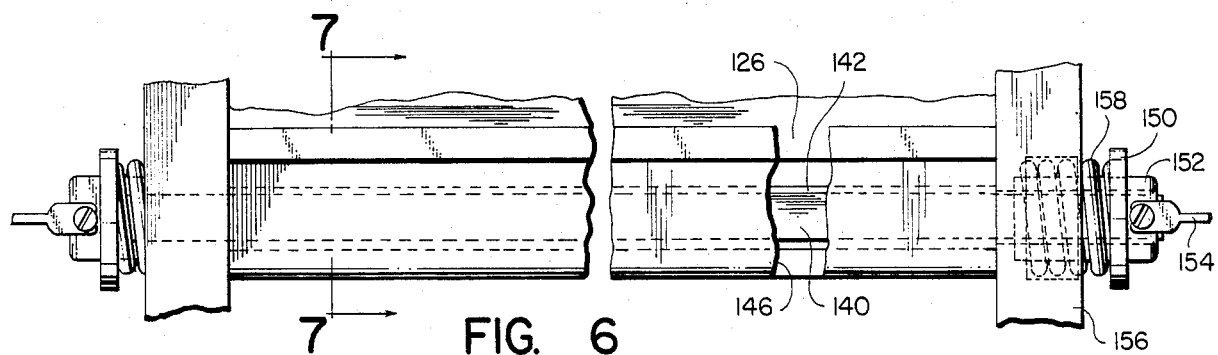
FIG. 6 is a fragmentary plan view showing the electrical resistance element mounted in one of the sealing heads.
Figure 7:
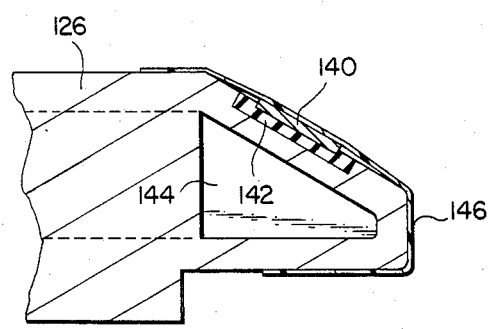
FIG. 7 is a fragmentary cross sectional view of the sealing head and resistance element as seen along the sectioning line 7—7 of FIG. 6.

FIGS. 5, 6 and 7 illustrate details of the electrical heating element 140 and the mounting of the heating element on the sloped surface of the detent 126. In one form, the heating element is a flat strip of resistance metal. One product suitable for this purpose and commercially available is a Nikrome wire which is a nickel-chromium metal strip having high electrical resistance characteristics for heating. The element 140 is mounted on a strip of insulation 142 such as a silicone rubber capable of withstanding the high temperatures of the heater while insulating the strip from the metallic detent 126. Preferably, the detent contains internal channels 144 for circulating a cooling fluid through the detent to prevent the welding tab from overheating and to encourage rapid cooling and setting of the weld when the element is deenergized. To further protect the material, the projecting end of the detent is covered with a release material 146 such as a polytetrafluoroethylene-coated glass cloth.

Electrical power for the resistance element 140 is applied through two identical connectors at opposite transverse ends of the heater. One of the connectors is detailed in FIG. 6 and is comprised by an insulator 150 which isolates the conductive connector 152 and the wire 154 from the housing 156 at the ends of the detent. A compression spring 158 holds the insulator and connector away from the housing and insures that the element 140 remains flat on the detent in tension as the heating and cooling of the element causes expansion and contraction.

In operation, the hot gas is discharged through the slots 124 and 130 in FIG. 4 onto the welding tabs c,d to initially deflect the tabs into adjacent relationship with the electrical heating element 140. The gas heats the thermoplastic material and applies a uniform pressure as it impinges upon the tabs and exits from the sealing heads through the backing plate 106. The valve plate 86 may initially close off a portion of the discharged slots so that thicker sections of the sealing area are heated before the thinner sections. When the tabs are in position, a pulse of current is conducted through the resistance element 140 of the heater to raise the temperature of the material at the side opposite the hot gas to a fusing temperature of, for example, 1,200° F. The hot gas on the one side of the sealing area and heater on the other side bring the material of the tube rapidly to a fusing temperature and weld the walls of the tube together along the entire width of the clamped tube walls. The velocity pressure of the hot gas insures uniformity of the weld. After the hot gas and thermal impulse have been applied and formed a weld in the clamped tube, the hot gas is terminated and a cold gas is supplied to the weld from the plenum chamber through the slots 124 and 130 to cool and set the weld.

In one example, a web consisting of double plies of 4 mil polyethylene material was formed into a bag having an overlap seam extending longitudinally along the bag and gussets at each corner. Thus, variations in thickness along the length of the transverse seam included four plies, six plies and eight plies of the 4 mil material. Nevertheless, a uniform and secure weld was produced in each thickness in a single clamping and sealing operation wth the hot gas at a temperature of 700° F. and a flat (0.125 inch×0.010 inch×22 inches) resistance element subjected to a current pulse at 33 volts. With these parameters, a 4–6 second cycle time for sealing is possible. In another example, a similar double-ply bag was prepared from 3 mil material.

Accordingly, a vertical form, fill and seal machine has been disclosed with a combined hot gas and thermal impulse sealer for improved production rates. The hot gas provides a free form clamp to press the sealing area on one side against an electrical resistance heater on the opposite side. The dual heating means permit heat to be added more rapidly to a weld for faster cycle times. The welds formed from the machine are uniform along the entire length of the seal even though the seal extends across various plies or material thicknesses.

While the present invention has been described in a preferred embodiment, it should be understood that numerous modifications and substitutions can be made without departing from the spirit of the invention. For example, the sealing heads as described above, serve as the feeding mechanism which draws the web W of thermoplastic material over the tube former 40. However, separate feed mechanisms can also be employed in the event that the sealing heads do not reciprocate along the vertical axis of the machine with a carriage. While a knife blade is shown as the means for severing the thermoplastic material between bags, other severing devices such as a hot wire can also be used. The clamping of the welding tabs by the sealing heads prior to severance of the tabs is important, but the clamping elements in the heads may have other configurations. Accordingly, the present invention has been described in a preferred embodiment by way of illustration rather than limitation.

I claim:

1. In a form, fill and seal machine in which a web of thermally sealable material is drawn over a tube former to bring the opposite longitudinal edges of the web together in adjacent relationship and a longitudinal sealing mechanism welds the opposite edges together to form a tube from the web, the machine having loading means for discharging measured quantities of a product into the formed tube, an improved sealing apparatus to periodically clamp the tube walls together and thermally form transverse seals across the tube at each side of a line of severance whereby individual sealed packages containing the product can be produced comprising: a pair of cooperating sealing heads disposed on opposite sides of the formed tube and mounted for relative movement toward and away from each other to clamp the tube along a transverse section of the tube containing the line of severance, the one of the sealing heads having means for discharging a hot gas onto one side of a transverse sealing area of the tube adjacent the line of severance to press the sealing area uniformly against the other of the sealing heads as a "free form" clamp, and the other of the sealing heads having electrical heating means disposed on the side of said transverse sealing area opposite from the means for discharging a hot gas for heating the pressed area to a fusing temperature in cooperation with the means for discharging a hot gas so that said sealing area is pressed between said hot gas and said electrical heating means.

2. In a form, fill and seal machine as defined in claim 1, the improved sealing means further including means mounted in the cooperative sealing heads for severing the clamped tube transversely along the line severance.

3. In a form, fill and seal machine as defined in claim 2, the improved sealing means wherein:

the means for severing is operative in a sealing operation to sever the tube and establish weld tabs at each side of the line of severance;

the pair of sealing heads are shaped to clamp the severed tube with the weld tabs having limited freedom of movement adjacent the electrical heating means; and the means for discharging hot gas has a discharge directed to impinge the hot gas in a stream against one of the weld tabs and press the tab against the electrical heating means as a free form clamp.

4. In a form, fill and seal machine as defined in claim 3, the improved sealing means wherein:

one of the sealing heads is shaped with a projecting detent which engages the formed tube as the sealing heads close in clamping relationship on the tube;

the other of the sealing heads is shaped with a recess generally corresponding to the projecting detent on the other head;

the projecting detent and corresponding recess defining a space in which a weld tab lies with limited freedom of movement when the heads are closed in clamping relationship; and the means for discharging the hot gas has a discharge terminating in the space between the detent and recess.

5. In a form, fill and seal machine as defined in claim 4, the improved sealing means wherein the electrical heating means is mounted on the projecting detent.

6. In a form, fill and seal machine as defined in claim 1, the improved sealing means wherein the electrical heating means comprises an electrical resistance element mounted on said other of the sealing heads in a position transverse to the formed tube.

7. In a form, fill and seal machine as defined in claim 6, the improved sealing means wherein the electrical resistance element is mounted adjacent the surface of the sealing head and a layer of release material overlies the element to prevent the thermally sealable material forming the tube from adhering to the resistance element during sealing.

8. In a form, fill and seal machine as described in claim 6, the improved sealing means wherein said other of the sealing heads on which the resistance element is mounted has cooling passageways for a cooling medium.

9. In a form, fill and seal machine as described in claim 6, the improved sealing means wherein the electrical resistance element is mounted on a strip of insulating material on said other of the sealing heads.

10. In a form, fill and seal machine for forming sealed packages of a product from a web of heat sealable material which is formed into a tube, and then the product is deposited in a measured amount in a closed end of the tube, an improved method of sealing the product in the tube comprising:

clamping the formed tube of heat sealable material at a station spaced along the tube from the closed end with the deposited product inbetween to press the tube walls together in a sealing area extending transversely of the tube;

applying heat and pressure to one side of the transverse sealing area by means of a hot gas directed onto the sealing area as a "free form" clamp; and applying heat to the other side of the transverse sealing area opposite the hot gas by means of an electrical heater to fuse the tube walls together and form a uniform seal whereby the sealing area is pressed between said hot gas and said electrical heating means.

11. In a form, fill and seal machine the improved method of sealing as defined in claim 10 wherein the step of applying heat by means of the electrical heater is performed simultaneously with the step of applying heat and pressure by means of a hot gas.

12. In a form, fill and seal machine, the method of sealing as defined in claim 10 wherein the step of applying heat by means of the electrical heater comprises holding the heat sealable material at said other side of the sealing area against the electrical heater by means of the hot gas and then applying heat suddenly by means of an impulse of current through the electrical heater.

13. In a form, fill and seal machine, the method of sealing as defined in claim 10 or 12 further including the step of severing the tube of heat sealable material along a line of severance extending adjacent and parallel to the transverse sealing area to provide a tab along one edge of the package formed from the tube prior to the step of applying heat by means of the electrical heater; and wherein the step of applying heat by means of the electrical heater includes placing the tab and the electrical heater in adjacent relationship and the step of applying heat and pressure to said one side of the sealing area comprises directing the hot gas against the tab to press the tab against the adjacent electrical heater.

14. In a form, fill and seal machine, the method of sealing as defined in claim 10 further including the step of cooling the transverse sealing area after the steps of applying heat to each side.

15. In a form, fill and seal machine, the method of sealing as defined in claim 14 wherein the step of cooling comprises cooling said one side of the transverse sealing area by terminating the hot gas directed onto the area and directing a cold gas onto the sealing area.

16. In a form, fill and seal machine, the method of sealing as defined in claim 14 wherein the step of cooling comprises cooling said other side of the transverse sealing area by mounting the electrical heater on a cooled support, and allowing the tab to contact the support after the steps of applying heat.

* * * * *